(12) United States Patent
Schick

(10) Patent No.: US 11,525,474 B1
(45) Date of Patent: Dec. 13, 2022

(54) FASTENER DEVICE FOR SECURING ARTICLES TO A SLATTED FLOOR

(71) Applicant: HOPS, Inc., Kutztown, PA (US)

(72) Inventor: Joseph Schick, Kutztown, PA (US)

(73) Assignee: HOPS, Inc., Kutztown, PA (US)

( * ) Notice: Subject to any disclaimer, the term of this patent is extended or adjusted under 35 U.S.C. 154(b) by 269 days.

(21) Appl. No.: 16/894,740

(22) Filed: Jun. 5, 2020

Related U.S. Application Data

(60) Provisional application No. 62/857,576, filed on Jun. 5, 2019.

(51) Int. Cl.
  *F16B 39/282* (2006.01)
  *A01K 1/01* (2006.01)

(52) U.S. Cl.
  CPC .............. *F16B 39/282* (2013.01); *A01K 1/01* (2013.01)

(58) Field of Classification Search
  CPC .... F16B 37/041; F16B 37/044; F16B 37/045; F16B 39/282
  USPC .......................................... 411/145, 172, 173
  See application file for complete search history.

(56) References Cited

U.S. PATENT DOCUMENTS

| | | |
|---|---|---|
| D29,156 S | 8/1898 | Caldwell |
| D59,346 S | 10/1921 | Gill |
| 1,793,745 A | 2/1931 | Norwood |
| 2,820,843 A | 1/1958 | Dreher |
| 3,141,221 A | 7/1964 | Faulls, Jr. |
| 4,075,924 A | 2/1978 | McSherry |
| D279,959 S | 8/1985 | Nimmo |
| 4,650,386 A | 3/1987 | McSherry |
| D297,702 S | 9/1988 | Persson |
| 4,813,809 A | 3/1989 | Stratman |
| D398,048 S | 9/1998 | Casady |
| D398,835 S | 9/1998 | Coll |
| D399,125 S | 10/1998 | Blanchard |
| 6,161,999 A | 12/2000 | Kaye |
| 6,413,005 B1 | 7/2002 | Massie |
| D461,657 S | 8/2002 | Magnusson |
| D476,134 S | 6/2003 | Miller |
| D481,001 S | 10/2003 | Gaudron |
| D494,997 S | 8/2004 | Weiler |

(Continued)

OTHER PUBLICATIONS http://eipmfg.com/products/Misc-Stall-Parts/Doubie-T-Bolt-P131C68.aspx EIP Manufacturing Quality Fabricated Steel Products Double T-Bolt 2 pages Available as a publication as of Mar. 14, 2019 Date of retrieval Jan. 24, 2020.

(Continued)

*Primary Examiner* — Roberta S Delisle
(74) *Attorney, Agent, or Firm* — Wilkinson Law Office; Clinton H. Wilkinson

(57) ABSTRACT

A cost-effective anchor member formed of sheet metal for use with a compression style fastener device for securing equipment such as hog penning and gates to a slatted floor, the anchor member having an elongated body with a curved center section and opposed inclined sections extending upwardly and outwardly from the center section, and a cutout formed in the curved center section in which an internally threaded attachment member is secured against rotating, wherein in use the anchor member is positioned extending laterally against the underside of the slatted floor with spaced apart contact locations supporting the anchor member and providing improved stability.

11 Claims, 5 Drawing Sheets

(56) References Cited

U.S. PATENT DOCUMENTS

| | | | |
|---|---|---|---|
| D513,970 S | 1/2006 | Sterling | |
| D532,682 S | 11/2006 | Maciag | |
| D608,183 S | 1/2010 | Meyer | |
| D631,736 S | 2/2011 | You | |
| D637,477 S | 5/2011 | Wall | |
| D639,646 S | 6/2011 | Finley, Jr. | |
| D651,890 S | 1/2012 | Gaudron | |
| D653,524 S | 2/2012 | Meyer | |
| D698,634 S | 2/2014 | Oetlinger | |
| D712,472 S | 9/2014 | Yuval | |
| D722,489 S | 2/2015 | Yamazaki | |
| D733,545 S | 7/2015 | Charette | |
| D760,583 S | 7/2016 | Weilage | |
| D766,688 S | 9/2016 | Cozzolino | |
| D801,782 S | 11/2017 | Wall | |
| D805,375 S | 12/2017 | Nehls | |
| D821,188 S | 6/2018 | Smullen | |
| D824,756 S | 8/2018 | Fischer | |
| D850,504 S | 6/2019 | Welter | |
| D871,900 S | 1/2020 | McDuff | |
| D876,211 S | 2/2020 | Wassdahl | |
| D882,831 S | 4/2020 | Carter | |
| D883,078 S | 5/2020 | Ma | |
| D903,479 S | 12/2020 | Schick | |
| D903,480 S | 12/2020 | Schick | |
| 2002/0078657 A1* | 6/2002 | Zambelli | F16B 37/045 52/707 |
| 2004/0170486 A1 | 9/2004 | DeMeo | |
| 2005/0117993 A1* | 6/2005 | Vassiliou | F16B 37/043 411/173 |
| 2011/0225793 A1 | 9/2011 | Daniels, III | |
| 2011/0268528 A1 | 11/2011 | Gaudron | |
| 2014/0010614 A1* | 1/2014 | Tan | B60P 7/0838 411/145 |
| 2014/0017031 A1 | 1/2014 | Prichard | |
| 2014/0250825 A1 | 9/2014 | Richardson | |
| 2016/0264198 A1 | 9/2016 | Laurenzo | |
| 2017/0307000 A1 | 10/2017 | Daly | |
| 2018/0347615 A1 | 12/2018 | Martin | |
| 2019/0136539 A1 | 5/2019 | Davis | |

OTHER PUBLICATIONS http://sdimfg.com/products/hardware/t-bolts, 1 page, Apr. 6, 2017. retrieved from Internet Archive Wayback Machine SDI T-Bolts https://web.archive.org/web/20200222162846/http://sdimfg.com/products/hardware/t-bolts on Sep. 21, 2020.

http://www.vittetoe.com/hardware VITTETOE Inc.J-BOLTS, 5 pages, Jun. 10, 2018, retrieved from Internet Archive Wayback Machine https://web.archive.org/web/20180610194216/https://www.vittetoe.com/hardware on Sep. 21, 2020.

https://swapinc.com/products/dura-lock, 1 page, Jul. 25, 2018, retrieved from Internet Archive Wayback Machine Southwest Agri-Plastics, Inc. DURA-LOCK Anchoring Systems https://web.archive.org/web/20180725011223/https://swapinc.com/products/dura-lock/ on Sep. 21, 2020.

https://www.farmerboyag.com/cast-iron-t-holt-kits, 1 page Feb. 20, 2018, retrieved from Internet Archive Cast Iron T-Bolt Wedge Kit Wayback Machine https://web.archive.org/web/20180220211336/http://www.farmerboyag.com/cast-iron-t-bolt-kits on Sep. 21, 2020.

https://www.hogslat.com/t-bolt-package-stainless-steel, 3 pages, Jun. 20, 2018, retrieved from internet Archive HOG SLAT T-Bolt Package-Stainless Steel Wayback Machine https://web.archive.org/web/20180620061230/http://www.hogslat.com/t-bolt-package-stainless-steel on Sep. 21, 2020.

* cited by examiner

FASTENER DEVICE FOR SECURING ARTICLES TO A SLATTED FLOOR

CROSS REFERENCE TO RELATED APPLICATIONS

This application claims the benefit of U.S. Provisional Application No. 62/857,576, filed on Jun. 5, 2019, which is hereby incorporated by reference in its entirety.

FIELD OF THE INVENTION

The present invention relates to fastener devices for securing equipment to floor structures, and more particularly to a compression style fastener device that is particularly useful in securing gating, fencing, and penning equipment to slatted flooring in hog pen facilities and confinement buildings, the fastener device including an anchor member formed of a single piece of sheet metal which is cost-effective and provides improved stability.

BACKGROUND OF THE INVENTION

The statements in this section merely provide background information related to the present disclosure and may not constitute prior art. At least a portion of the floor of modern market hog buildings is usually slatted which avows animal waste and excrement to fall through the slots or spaces between individual adjacent slats into a pit or deposition area below the floor. Slatted floor sections, which are conventionally made of precast concrete but may also be made of plastic or other materials, are advantageous in that they provide improved hygiene and health for the animals, allow a higher concentration of hogs to be housed in a pen area, and reduce labor and cleaning time.

Large hog pen facilities also require installation of various penning, fencing, and gating equipment to separate the floor into numerous smaller pen areas, alleys, and walkways, including custom layouts which better facilitate confining, guiding, sorting, herding, and managing of the hogs. This equipment must be stably secured in place on the hog pen floor, which is typically accomplished by anchoring floor or base plates which support the equipment to the flooring. An end of a gate or panel may also be secured to a solid wall structure or to a piece of adjacent equipment using suitable brackets. Other standard equipment, such as feeders, waterers, and scales for weighing the hogs must be similarly secured.

The equipment base plates are frequently secured to a slatted flooring section using compression style t-shaped fasteners. These include both a design having a threaded shaft portion attached such as by welding to an elongated crosspiece or anchor, as well as a two piece design in which a conventional bolt is threadedly secured to the anchor section. In the welded design, the crosspiece is inserted downwardly through one of the slots in the slatted floor section, with the threaded shaft extending above the slatted floor. The crosspiece is then turned or rotated to be oriented transverse to the longitudinal axis of the slats under the floor section. The threaded shaft portion is passed through an aperture or slot in the equipment floor plate and secured by a nut or other securing member, such that the nut is pressing downwardly on the base plate and the crosspiece is pressing upwardly against the underside of the slats. In the two-piece compression design, the bolt member shaft is downwardly inserted through the floor plate aperture and threadedly connected to the elongated anchor, which is then similarly oriented and secured transversely against the underside of the slats by tightening of the bolt member.

A drawback inherent in the use of t-bolts having a welded-on anchor is that the threaded end of the shaft protrudes upwardly above the top surface of the floor plate, and can cut or harm hogs that either intentionally or accidentally step or lie on the floor plate. In addition, in a currently popular version, the t-bolt is formed of a threaded stud welded to a piece of flat bar which forms the crosspiece or anchor, but the welding operation required increases the cost of manufacture. Conventional t-bolts can also be more difficult to install and typically require one person above the floor and one person in the waste deposition area below for proper installation, increasing installation cost and complexity. In a two-piece design, the anchors are generally molded or cast using materials such as iron, stainless steel, or plastic, and require a female threaded bolt attachment portion containing a sufficient number of threads to securely hold the bolt shaft, which also must be strong enough to withstand the compression forces exerted on the anchor by the bolt when tightened. A significant amount of molded or cast material is therefore required to form the anchor portion, which increases the cost of manufacture. One solution to reduce cost and material is to fabricate the anchor portion out of molded plastic which is shaped to wedge into the slot in the slatted floor rather than spanning across the underside of multiple slats. Such a design decreases the amount of material necessary to provide adequate strength for fastening the accompanying bolt and also reduces the length of the bolt, but can also crack and damage the inner edges of the slats as they are not designed to handle forces exerted on them in this way.

Despite the available fasteners, there remains a need for a fastener device for securing equipment such as penning, fencing, and gates to the slatted floors of hog growing buildings having an anchor member which can be easily inserted downwardly between the slats and then secured against the underside of the slats without requiring multiple installers above and below the floor, that minimizes material costs, is easy to maintain, and is cost-effective to manufacture while also being sufficiently strong and durable to withstand the considerable forces exerted on the equipment by hogs weighing 300 pounds or more pushing against the equipment.

SUMMARY OF THE INVENTION

The present invention is an anchor member for use with a compression style fastener device for securing equipment to a slotted floor in an animal confinement room or building. The fastener device in an embodiment includes the anchor member, a threaded fastener and washer, and an attachment member which is affixed to the anchor member. In certain embodiments of the invention the anchor member is a one-piece construction formed of a single piece of sheet metal such as stainless steel which is generally C- or U-shaped and has an elongated configuration with longitudinally spaced apart open ends. The anchor member has a curved center section defining a first bend radius, and opposed inclined sections extending upwardly and outwardly from the center section. In an embodiment, inwardly curved sections having a second bend radius are formed on the outer ends of the inclined sections, which then join with parallel outer end sections having planarly aligned end walls which in use are in direct physical contact with the underside of a floor slat. The anchor member is dimensioned to be inserted downwardly between the floor slats of the animal confinement room or building.

During fabrication, a cutout in the anchor member is made in the curved center section, which cutout has oppositely disposed transverse faces and longitudinal faces. The cutout serves as a receiving portion for the nut or attachment member which fits snugly between the transverse faces. In an embodiment, the attachment member may be held in place in the cutout during installation by a tool used to aid in installing such t-fasteners, or may be secured in the cutout by press-fitting or gluing as part of the manufacturing process. The tight fit between the attachment member and cutout prevents the attachment member from rotating in the cutout when the threaded fastener is turned, while in addition the attachment member is prevented from passing upwardly through the cutout, and acts as a keystone in the cutout which causes the anchor member to resist bending under load. In an embodiment, the attachment member is a square nut, while in other embodiments is a hex nut or another member having opposite parallel side surfaces which are dimensioned to have a close fit between the transverse side faces of the cutout in the anchor member.

In certain implementations, the fastener device including the anchor member is used to secure equipment such as penning, fencing, posts, and the like to the slatted floor of a hog confinement building. The equipment will typically have a floor or base plate with apertures or slots which are utilized with the fastener device to secure the equipment to the slatted floor in a desired position and orientation. A washer is inserted over the shaft section of the fastener, which shaft is then passed downwardly through an aperture or slot in the equipment base plate. If the attachment member has not previously been secured in the cutout during the manufacturing process, the attachment member is positioned in the cutout from the outwardly facing wall side of the anchor member, and the installation tool is used to hold and lower the anchor member and attachment member through a slot between the slats underneath the base plate. The anchor member is then rotated ninety (90) degrees into an anchoring orientation extending laterally across the underside of the slats, and is held in position while the shaft section of the fastener is passed through the slot into the attachment member. A suitable tool such as a ratchet or impact wrench is then used to tighten the fastener, which pulls the nut and anchor member upwardly until the outer end walls of the anchor member are forcibly pressing against the underside of the slatted floor. Multiple fastener devices will ordinarily be used to firmly secure the floor plate to the slatted floor.

Manufacturing the anchor member from sheet metal, preferably stainless steel due to its strength and corrosion resistance, and requiring only consistent bend orientations which provide spaced apart contact locations for the anchor member against the underside of the slats gives the anchor member greater stability than conventional t-bolts, while also making the manufacturing process more cost-effective. In addition, the cutout in combination with the fastener member eliminates the need for a threaded aperture to be formed as part of the anchor member, further reducing material and manufacturing costs.

BRIEF DESCRIPTION OF THE DRAWINGS

The accompanying drawings, which are incorporated in and form a part of the specification, illustrate embodiments of the present invention which will become more fully understood together with the detailed description, wherein.

Figure 10:
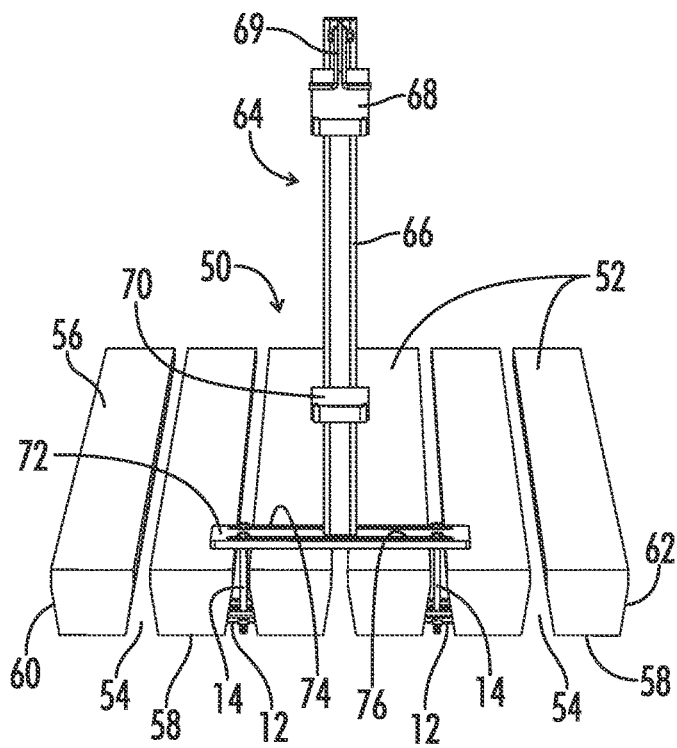
FIG. 10 illustrates the fastener device of the invention in use to secure a post to a slatted floor section.

Ha 11 is a view of the underside of the slatted floor shown in FIG. 10.

Figure 12:
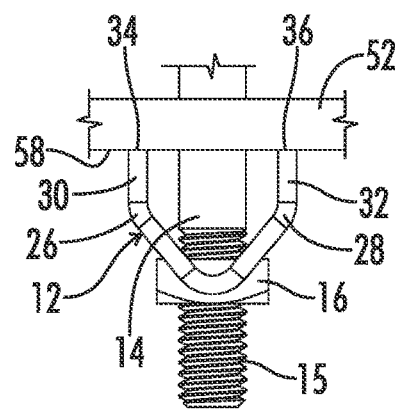

FIG. 12 is a closeup elevation view of an anchor member secured to the underside of one of the slats.

Figure 13:
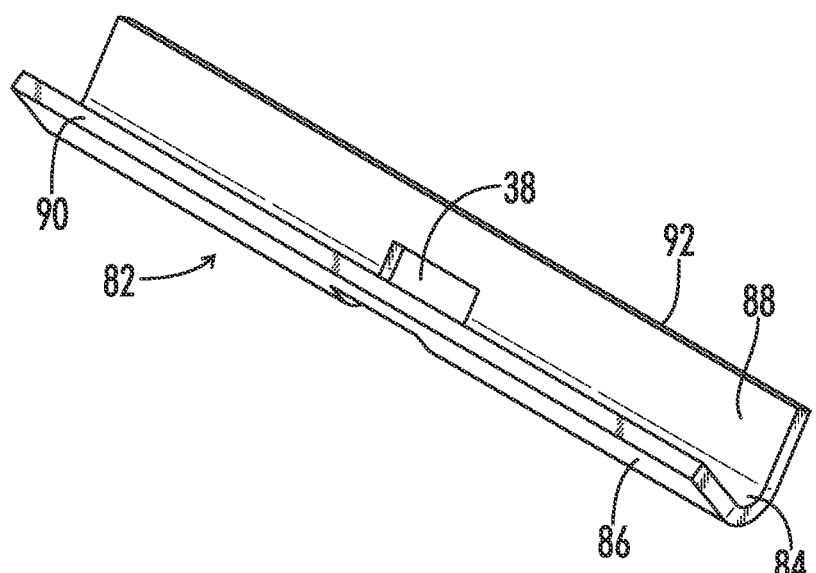

FIG. 13 is an isometric view of an alternative anchor member for use with the fastener device of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following description of the preferred embodiment(s) is merely exemplary in nature and is in no way intended to limit the invention, its application, or uses. Reference will now be made in detail to embodiments of the present invention, examples of which are illustrated in the accompanying drawings. While the present invention will be described in conjunction with various embodiment(s), such description is not intended to be understood in a limiting sense, but to be an example of the invention presented solely for illustration thereof, and by reference to which in connection with the following description and the accompanying drawings one skilled in the art may be advised of the advantages and benefits of the invention. On the contrary, the present invention is intended to cover alternatives, modifications and equivalents, which may be included within the spirit and scope of the invention as defined by the appended claims.

Figure 1:
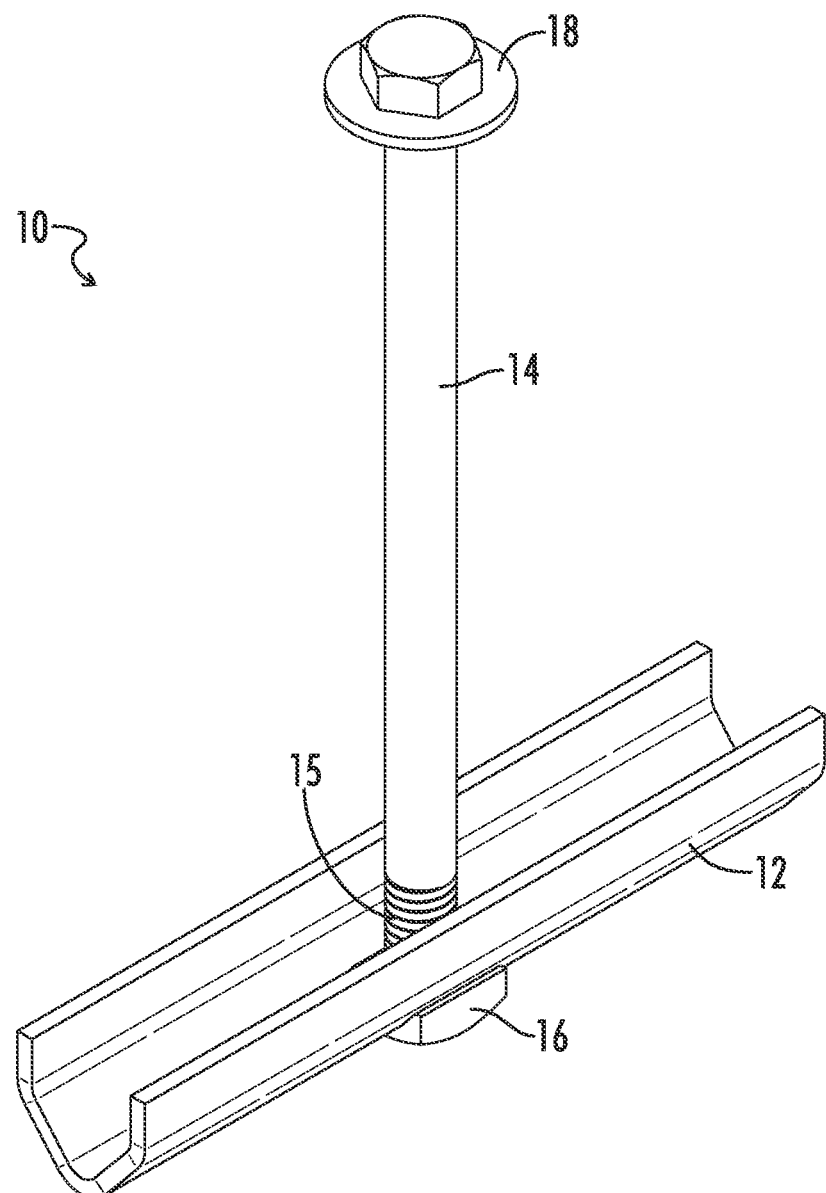
FIG. 1 is an isometric view of a compression style fastener device incorporating an embodiment of the anchor member of the present invention.
Figure 2:
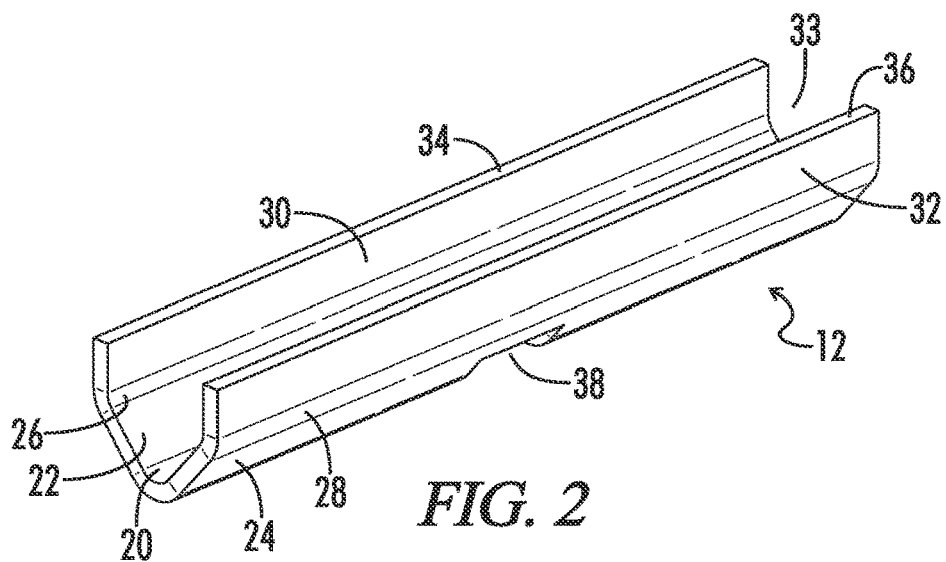
FIG. 2 is an isometric view from the top of the anchor member shown in FIG. 1.

FIG. 1 illustrates an embodiment of a fastener device 10 in accordance with the present invention, which includes the following components: an anchor member or apparatus 12, a threaded fastener 14, an attachment member 16, and a washer 18. Threaded fastener 14 may be a stainless-steel bolt of a suitable grade, length and diameter, with Unified Inch or Metric screw threads positioned on at least the outer end portion of the bolt shaft 15. Attachment member 16 may be an internally threaded square nut with matching threads dimensioned to receive the threads of fastener 14.

Anchor member 12, shown in greater detail in FIGS. 2-6, is a one-piece construction which is preferably cut, folded, and formed of a single piece of sheet metal of a suitable material having a uniform thickness such as, but not limited to, stainless steel. The anchor member or apparatus 12 has a body with an elongated configuration with longitudinally spaced apart open ends 19 and 21, and a length between ends 19 and 21 sufficient to span transversely between two spaced apart adjacent slats of a slatted floor separated by a longitudinal slot (see FIG. 12). As shown in the end view in FIG. 4, anchor member 12 is generally C- or U-shaped, with a substantially C-shaped or U-shaped cross section, which shape provides the anchor member 12 with the strength necessary for its sheet metal construction to meet the requirements of the device 10. More particularly, anchor member 12 includes an upwardly curved center section 20 having a first bend radius. Opposed inclined sections 22 and 24 extend upwardly and outwardly from center section 20, terminating at inwardly curved sections 26 and 28, respectively, each having a second bend radius. In an embodiment, the first bend in the curved center section 20 is such that inclined sections 22 and 24 extend upwardly and outwardly at about a 55-degree angle.

Inwardly curved sections 26 and 28 connect with parallel outer sections 30 and 32, respectively, having end walls 34 and 36, respectively, which end walls are planarly aligned. In an embodiment, the bend in inwardly curved section 26 and 28 is such that outer sections 30 and 32 extend upwardly in parallel at a 90-degree angle. A longitudinal channel 33 defined by the inwardly facing wall 35 of anchor member 12 is formed between ends 19 and 21. Preferably, the outwardly facing wall 37 of anchor member 12 has a width between outer sections 30 and 32 that is at least slightly less than the width of the slots between adjacent slats in a slatted hog pen floor, in order to allow the anchor members to be inserted downwardly between the floor slats with relative ease. In an embodiment, anchor member 12 is formed from a sheet of 12 GA 304 stainless steel which has been cut to a length of about seven inches from end 19 to end 21, and a width of about 1.90 inches. After bending, in an embodiment anchor member 12 has a width between the outer wall 37 of outer sections 30 and 32 of about 0.85 inches, and a height from the bottom outer wall of curved center section 20 to end walls 34 and 36 also of about 0.85 inches.

Figure 3:
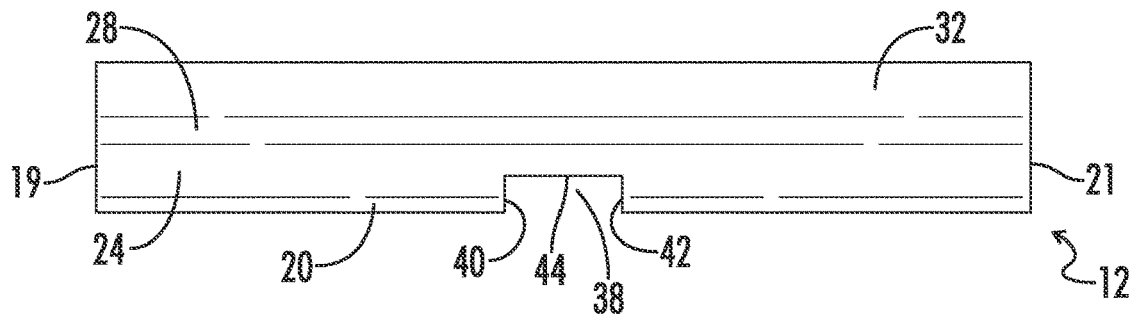
FIG. 3 is a side elevation view thereof.
Figure 4:
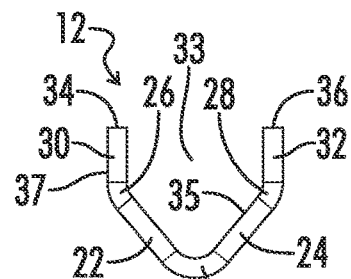
FIG. 4 is an end elevation view thereof.
Figure 5:
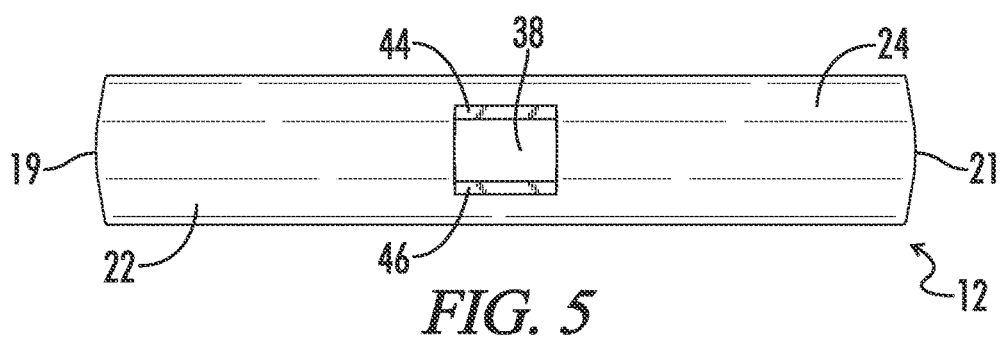
FIG. 5 is a bottom view thereof.
Figure 6:
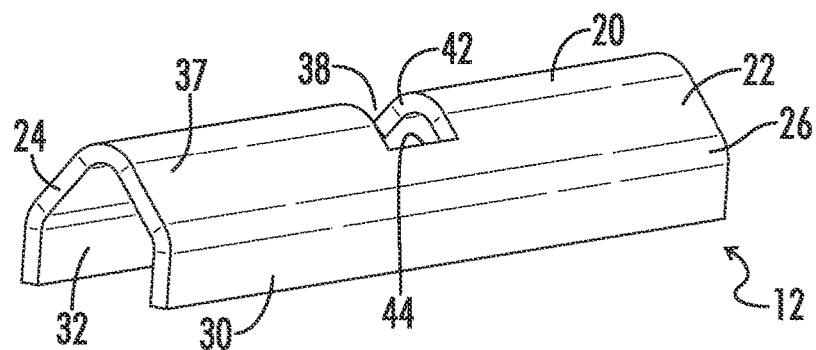
FIG. 6 is an isometric bottom view thereof.

In addition, as shown in FIG. 5, during fabrication a cutout 38 is formed in center section 20 of anchor member 12 at a location intermediate from the ends 19 and 21 of the anchor member 12. Cutout 38 also extends partially into outwardly inclined sections 22 and 24, and as shown in FIGS. 3 and 6 in the illustrated embodiment is defined by oppositely disposed transverse faces 40 and 42 and longitudinal faces 44 and 46 which connect between the transverse faces 40 and 42. In the illustrated embodiment, transverse faces 40 and 42 of cutout 38 are substantially transverse to the longitudinal axis of anchor member 12, while faces 44 and 46 are aligned along the longitudinal axis of anchor member 12. Cutout 38 in the illustrated embodiment therefore has a substantially rectangular form when viewed from the underside of the anchor member 12 as in FIG. 5. In addition, as a result of bending of the anchor member 12 into its substantially C or U-shape, faces 44 and 46 of cutout 38 are inclined downwardly. In an embodiment, the corners joining inwardly facing wall 35 and faces 44 and 46 are about 0.35 inches apart, wherein after bending the actual dimension is about 0.38"-0.39", while the corners joining outwardly facing wall 37 and faces 44 and 46 are about 0.53 inches apart. In an embodiment, the threads of a $3⁄8^{th}$-16 screw must fit through cutout 38.

Figure 7:
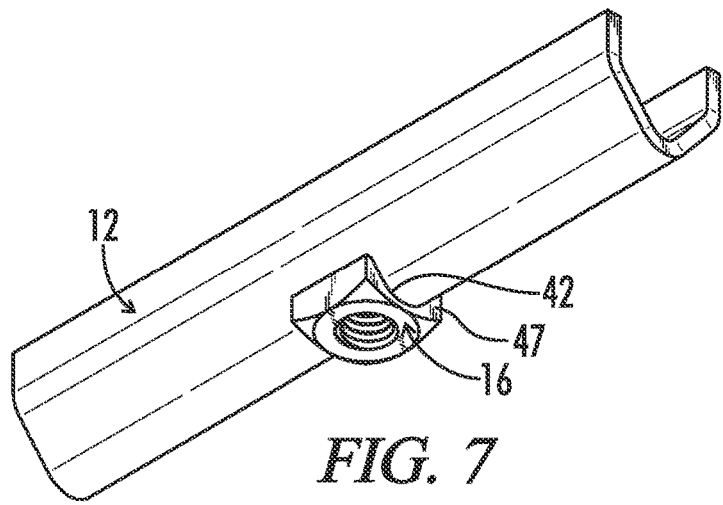
FIG. 7 is bottom view of the anchor portion with an attachment member positioned in the cutout.
Figure 9:
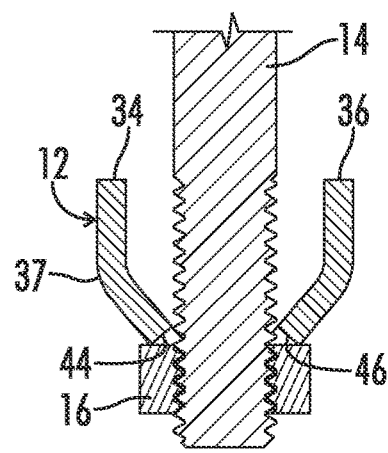
FIG. 9 is a cross-sectional view taken along line 9-9 in FIG. 8.
Figure 8:
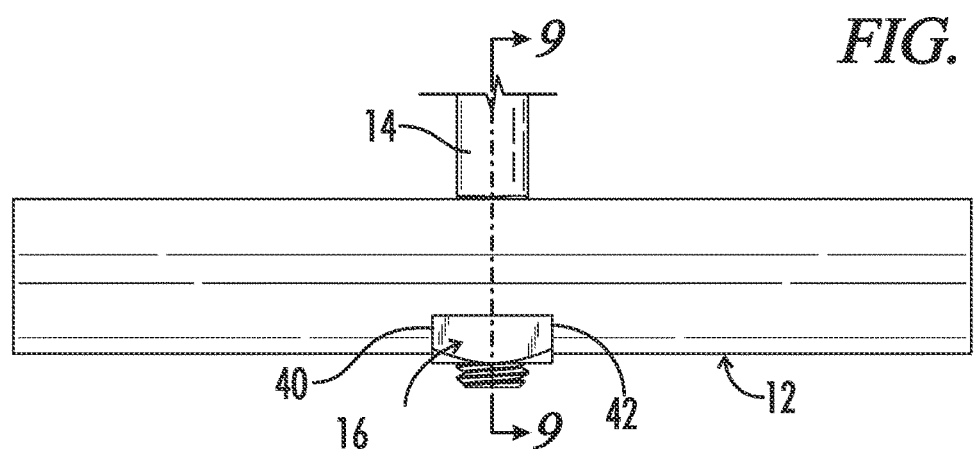
FIG. 8 is side elevation view of the anchor portion in combination with a bolt fastener and securing member.

Cutout 38 serves as a receiving portion for the nut or attachment member 16 which is threadably secured to anchor member 12. As shown in FIGS. 7-8, the outer walls 47 of attachment member 16 are angled and dimensioned to fit snugly between the transverse faces 40 and 42 of cutout 38. During use of the anchor member 12, in an embodiment the attachment member 16 may be held in place in the cutout 38 by an installation tool used to aid in using the t-fasteners 10. Alternatively, the attachment member 16 may be secured in the cutout 38 by another means such as press-fitting or gluing as part of the manufacturing process. Press-fitting the attachment member 16 in the cutout 38 would require that the cutout 38 be slightly undersized. Regardless of which securing arrangement is utilized, when the attachment member 16 is placed in cutout 38 during use of the device 10 in the manner explained below, with opposed side walls 47 of the attachment member 16 positioned between side faces 40 and 42 of the cutout 38, the attachment member 16 will be secured against rotating in the cutout 38, particularly when bolt 14 is threadedly passed into member 16. In addition, as best shown in the cross sectional view of FIG. 9 taken along line 9-9 in FIG. 8, the inwardly facing surface of attachment member 16 in cutout 38 will abut against the angled edge formed by the intersection of outer wall 37 of anchor member 12 and walls 44 and 46 of the cutout 38. As shown by FIGS. 7-9, attachment member 16 is dimensioned to be wider than the cutout 38 between walls 44 and 46 while fitting snugly between transverse walls 40 and 42, which arrangement both prevents the attachment member 16 from rotating in cutout 38 as well as passing upwardly through cutout 38. In addition, as bolt 14 is increasingly torqued, attachment member 16 acts like a keystone in cutout 38, causing anchor member 12 to resist bending under load.

In the Figures, attachment member 16 is illustrated as being a square nut with a beveled outer surface. A square nut in general will have longer side surfaces than similarly sized attachment members having a greater number of side surfaces, such as a hex nut. As a result, a greater surface area of the side surface of a square nut may be in contact with side faces 40 and 42 of cutout 38, which resultingly will provide a greater resistance to turning in cutout 38. It will be understood however that the present invention may also be used with other attachment members such as but not limited to hex nuts having a pair of opposite side surfaces which are dimensioned to fit snugly between the side faces 40 and 42 of the cutout 38. In addition, cutout 38 may be dimensioned to fit attachment members having different thicknesses or widths as may be required for the particular application while still falling within the intended scope of the present invention.

The manner of use of the present invention will now be described with particular reference to FIGS. 10-12. A section of a hog pen floor 50 is shown, which is formed of a plurality of elongated concrete slats 52. The slats 52 are aligned in parallel and are equally spaced apart by slots 54 positioned extending longitudinally between adjacent slats 52. The slats 52 have a top surface 56, a bottom surface 58, and opposite side surfaces 60 and 62. The slats 52 are typically provided over at least the portion of the hog pen floor having a waste pit, and are supported in any suitable manner such as by a system of beams and posts. The slots 54 have a width that is appropriate for the particular age and size of the hogs to be accommodated in a space, and for hogs over seven weeks old the slot width may be approximately one inch, although this may vary slightly depending upon the desired configuration. It will be understood that slatted floor 50 may be manufactured as a plurality of individual slats, in sections or panels each containing a plurality of slats, or in other suitable manners.

Figure 11:
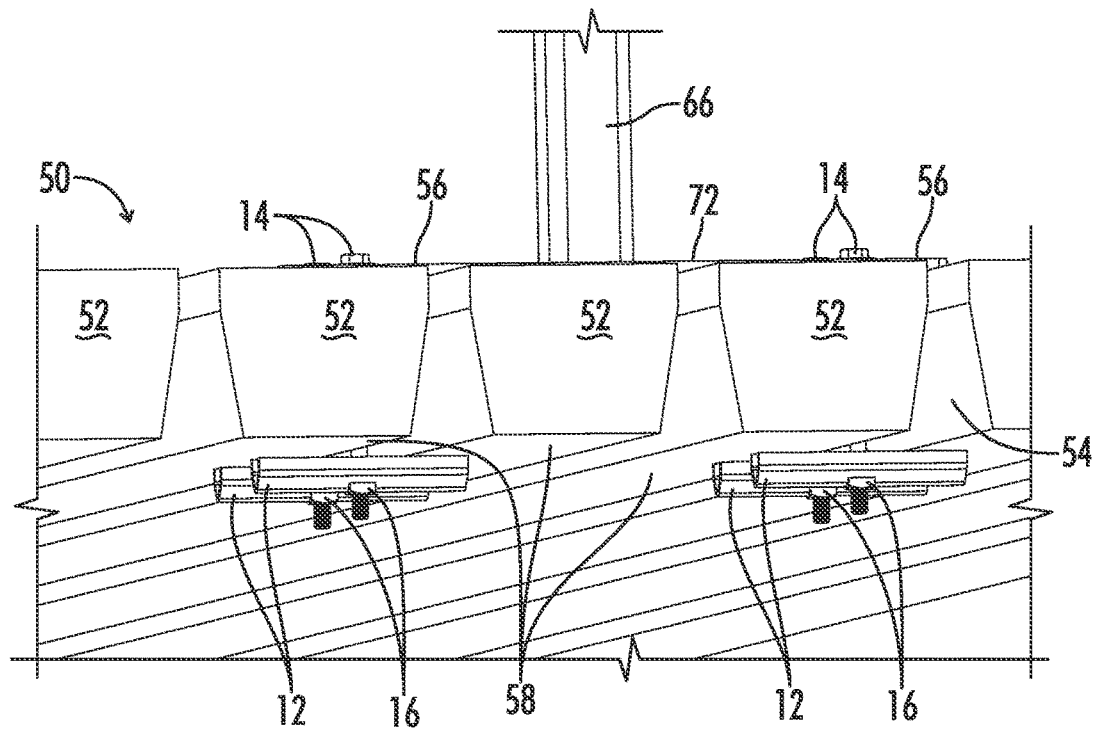

Also shown in FIGS. 10-11 is a post assembly 64 which is secured to the floor section 50 using the anchor members 12 of the present invention. Post assembly 64 includes an elongated square post or upright 66, a top flipper assembly 68 and latch 69, a bottom flipper assembly 70, and a floor or bottom plate 72 secured to the lower end of the post upright 66. Plate 72 also includes a pair of elongated slots 74 and 76 positioned on opposite sides of the post 66. Other base plates may be provided with a number of individual apertures rather than a pair of elongated slots. Slots 74 and 76 are sized to allow the shaft portion of fasteners 14 to pass through the slots, but not the head portion of the fasteners 14 or the washer 18. The slots 74, 76 allow the fasteners 10 to be easily positioned at any suitable location along the length of the slots, which location will depend on the desired placement of the plate 72 in relation to the slotted flooring 50.

To use the fastener device 10, washer 18 is inserted over the shaft section of fastener 14, and the shaft section is then passed downwardly through one of the slots 74, 76 in the bottom plate 72 of the post assembly 64 (or other equipment being secured). Where attachment member or square nut 16 is not already press-fitted, glued, or otherwise secured in cutout 38 during the manufacturing process, nut 16 is placed in cutout 38 from the outwardly facing wall side 37 of the anchor member 12. An installation tool is then used to hold the anchor member 12 and attachment member or nut 16 and lower them downwardly through a slot 54 between the slats 52 located underneath the location on the floor 50 base plate 72 is to be installed. Once the anchor member 12 has been lowered to a depth to clear the underside 58 of the slats 52, the anchor member 12 is rotated ninety (90) degrees into an anchoring orientation extending laterally across the underside 58 of the pair of slats 52 adjacent the selected slot 54. The anchor member 12 is held in this position while the shaft section of fastener 14 is inserted downwardly into slot 54 through the anchoring point and the threaded end 15 of the shaft section is threadably connected to the attachment member 16. The above steps are then repeated for each of the fastener devices 10 to be utilized in securing a piece of equipment to the hog pen floor 50.

As shown in FIGS. 10-11, there are two fastener devices 10 positioned in each slot 74 and 76 in the floor plate 72 on either side of the post 66, or four total fastener devices 10. The anchor member 12 for each fastener device 10 is turned such that, using the installation tool, it can be inserted downwardly into one of the slots 54 between the opposite side surfaces 60 and 62 of adjacent but spaced apart slats 52. Once inserted into a slot 54 to a depth below the underside 58 of the slats 52, the anchor member 12 is then turned such that it is extending substantially transverse to the slats 52. An appropriately sized socket, cordless drill, impact wrench, or another suitable tool may then be used to thread bolt 14 into nut 16. When the threaded bolt 14 is tightened, nut 16 will be pulled upwardly, and in turn since as shown in FIG. 9 nut 16 is pressing against the edges formed by wall 37 of the anchor member 12 and walls 44 and 46 of cutout 38, anchor member 12 will also be pulled upwardly. As the bolt 14 is further tightened, as shown in FIG. 12 anchor member 12 will move upwardly until the outer walls 34 and 36 of end sections 30 and 32 of anchor member 12 are forcibly pressing against the underside 58 of the slats 52, while the washer 18 and bolt head are pressing downwardly on base plate 72 and providing a compression force which firmly secures the floor plate 72 and post assembly 54 to the slatted floor 50.

By manufacturing anchor member 12 from a single piece of sheet metal which is shaped to provide two spaced apart contact locations each of which when the fastener device 10 is installed abut against the underside 58 of the slats 52, namely outer walls 34 and 36 of end sections 30 and 32, a surprisingly strong and stable mounting with the hog pen floor 50 is provided. The preferred sheet metal material is stainless steel due to its strength and corrosion resistance. Bends 26 and 28 which enable end sections 30 and 32 to be parallel provide significant additional strength to the anchor member 12. Spaced-apart end sections 30 and 32 give anchor member 12 greater stability than conventional t-bolts, which aids in preventing the fastener device 10 from loosening over time or becoming dislodged. The use of consistent bend orientations, or bends in the same plane and in the same direction, also means there is no need for part reorientation during manufacturing, making the manufacture process even more cost-effective. There are also no bolt shafts extending above the slots as in certain prior art arrangements, which is known to potentially cause significant injury or discomfort to hogs who happen to step or lie on the shaft.

The provision of cutout or square nut receiving portion 38 allows the anchor member 12 to be manufactured from a standard sheet metal using 3D CAD files which are converted into machine code to be used by an automated CNC machine. The nut receiving portion 38 in combination with a square nut or fastener eliminates the need for a threaded aperture to be formed as part of the anchor member 12 for receiving a bolt member as in other prior art arrangements. While threading of sheet metal is possible, the thinness of the sheet metal material only allows for a few threads which are too weak to be used to tightly secure an equipment floor plate to a slatted floor. Further, in the present invention any such threads would be located in curved or bent center section 20 of the anchor device 12, and therefore would be deformed during fabrication if threaded before bending. Threading after bending would result in a weak and fragmented thread pattern. The present inventor has therefore developed a t-fastener anchor device that can be manufactured using sheet metal which overcomes the problems associated with such material, and includes the required strength and durability, in a cost-effective way.

FIG. 13 illustrates another embodiment of the anchor member of the present invention used in connection with the t-fastener device. Anchor member 82 shown in FIG. 13 is similar to anchor member 12, with the exception that anchor member 82 has a substantially triangular or V-shaped cross section as compared to anchor member 12, as bends 26 and 28 in anchor member 12 are not provided in anchor member 82. Anchor member 82 has a similarly curved center section 84 which is connected to oppositely and outwardly angled sections 86 and 88, in which a similar cutout 38 for receiving attachment member 16 is formed. Sections 86 and 88 extend to the outer end walls 90 and 92, respectively, rather than curving inwardly such that the end sections of the anchor member are substantially aligned parallel to each other as in the previous embodiment. Anchor member 82 therefore similarly provides strong and stable mounting against the underside of the slats 52.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. As used throughout, ranges are used as shorthand for describing each and every value that is within the range. Any value within the range can be selected as the terminus of the range.

What is claimed is:

1. An anchor member for use with a t-fastener apparatus comprising:
   an elongated body having a longitudinal axis extending between first and second ends, said body having a curved center section formed by a first longitudinal bend, and side sections angled extending upwardly and outwardly from the curved center section; and
   a cutout located in the center section of the body intermediate of the first and second ends and extending into the side sections, said cutout defining a pair of spaced apart transverse side walls and longitudinal walls connecting between the side walls, said cutout dimensioned to receive an attachment member in the cutout inserted from an outwardly facing wall of the anchor member, the cutout having a width between the longitudinal walls which is less than the width of the attachment member preventing the attachment member from passing through the cutout, and wherein the attachment member is secured against rotation in the cutout when positioned between the transverse side walls of the cutout.

2. The anchor member of claim 1 wherein the anchor member has a substantially V-shaped cross section.

3. The anchor member of claim 1 additionally comprising a second longitudinal bend at an intermediate location in the side sections, forming a pair of end sections extending outwardly from said longitudinal bend in parallel.

4. The anchor member of claim 3 wherein the parallel end sections additionally comprise coplanar end walls, said end walls serving as contact locations for the anchor member when secured against an underside of a slatted floor.

5. The anchor member of claim 3 wherein the anchor member has a substantially U-shaped or C-shaped cross section.

6. The anchor member of claim 1 wherein the anchor member is constructed from a sheet metal material.

7. The anchor member of claim 1, in which the anchor member is formed from a single piece of shaped stainless steel.

8. An anchor for use with a fastener device for securing articles to a slatted floor comprising:
   a member formed from sheet metal having first and second longitudinally spaced open ends, a longitudinal bend extending between the first and second ends which forms a curved center section, a pair of opposed oppositely angled spaced-apart side sections defining a longitudinal slot between the side sections, and an opening positioned in the center section intermediate of the first and second ends, wherein a securing member positioned in the opening is secured against rotation when a corresponding fastener is threadedly connected to the securing member.

9. The anchor of claim 8 additionally comprising second and third longitudinal bends in the side sections, forming a pair of generally parallel end sections having coplanar end walls.

10. The anchor of claim 9 wherein the securing member is a square nut.

11. An anchor member comprising:
   an elongated body formed of sheet metal having a longitudinal axis and substantially U-shaped or C-shaped cross section; and
   a cutout formed at an intermediate location between opposite ends of the elongated body, said cutout having a pair of side walls transverse to the longitudinal axis of the body and spaced apart a distance to receive a threaded attachment member in the cutout having opposite walls dimensioned to fit snugly between the transverse side walls of the cutout.

* * * * *